United States Patent
Chang et al.

[11] Patent Number: 5,960,042
[45] Date of Patent: Sep. 28, 1999

[54] METHOD IN A SELECTIVE CALL RECEIVER FOR SYNCHRONIZING TO A MULTI-LEVEL RADIO SIGNAL

[75] Inventors: Chun-Ye Susan Chang, Boynton; Clinton C. Powell, II, Lake Worth; James Michael Keba, Wellington, all of Fla.; Stephen R. Carsello, Ft. Worth, Tex.

[73] Assignee: Motorola, Inc., Schaumburg, Ill.

[21] Appl. No.: 08/886,356

[22] Filed: Jul. 1, 1997

[51] Int. Cl.$^6$ .................................................. H04L 25/49
[52] U.S. Cl. ........................ 375/293; 375/360; 375/334; 329/300
[58] Field of Search .................................. 375/281, 286, 375/293, 294, 334, 335, 360, 362, 371; 329/300, 302, 303

[56] References Cited

U.S. PATENT DOCUMENTS

| | | | |
|---|---|---|---|
| 5,208,833 | 5/1993 | Erhart et al. | 375/294 |
| 5,548,615 | 8/1996 | Wei | 375/281 |
| 5,901,188 | 5/1999 | Roither | 375/360 |

FOREIGN PATENT DOCUMENTS

| | | |
|---|---|---|
| 2 057 820 | 4/1981 | United Kingdom . |
| 2 173 364 | 10/1988 | United Kingdom . |

*Primary Examiner*—Stephen Chin
*Assistant Examiner*—Chieh M. Fan
*Attorney, Agent, or Firm*—James A. Lamb

[57] ABSTRACT

A selective call receiver (800), including a receiver circuit (101) and a processor (810), is used for synchronizing an internal reference to symbol edges of a plurality of symbols in a multi-level radio signal transmitted by a radio communication system. To perform this function the processor (810) is adapted to cause the receiver circuit (101) to demodulate the multilevel radio signal to in-phase and quadrature signals (108, 106), convert the in-phase and quadrature signals (108, 106) to a sequence of state transitions representative of the plurality of symbols, detect at least one same state transition from the sequence of state transitions, and synchronize the internal reference to the at least one symbol edge of the plurality of symbols based on the at least one same state transition.

24 Claims, 10 Drawing Sheets

METHOD IN A SELECTIVE CALL RECEIVER FOR SYNCHRONIZING TO A MULTI-LEVEL RADIO SIGNAL

RELATED INVENTION

The present invention is related to the following invention which is assigned to the same assignee as the present invention:

Application Ser. No. 08/753,816 filed Dec. 2, 1996, entitled "Method and Apparatus for Demodulating a Frequency Shift Keyed Signal."

FIELD OF THE INVENTION

This invention relates in general to selective call receivers, and particularly to a method in a selective call receiver for synchronizing to a multi-level radio signal.

BACKGROUND OF THE INVENTION

Currently, selective call receivers (SCR's) that receive FSK signals utilize analog demodulation circuits. These circuits employ conventional front-end mixers for mixing a high frequency FSK signal (e.g., 900 MHz) to an intermediate frequency (IF) FSK signal (e.g., 455 KHz). Generally, the IF-FSK signal is demodulated into baseband analog signals by a discriminator circuit (that converts frequency signals to multi-level baseband voltage signals) and a post-detection filter. For a 4-level FSK signal, for example, the output of the discriminator is a four level voltage signal, each voltage level representing a symbol (2 bits) of data.

Thereafter, the output of the discriminator is conditioned by a conventional post-detection filter which removes high frequency noise. Finally, the conditioned signal is processed by a conventional symbol synchronizer and a conventional symbol decoder, which convert the 4-level signal into digital symbol data (i.e., two data bits of information).

A substantial portion of these circuits are designed with analog circuit techniques. Although these circuits are generally effective in demodulating FSK signals, they characteristically have several undesirable drawbacks. The most significant drawback being that of high energy consumption, which has an adverse effect on the battery life performance of the SCR's. Another significant drawback is the difficulty in manufacturing high quality SCR's that utilize these analog circuits.

A significant portion of defects in the manufacture of SCR's is found in the analog receivers contained therein. Because of the parametric variances encountered with analog circuit components, an RF tuning step is required for the analog receiver. It is this step where most manufacturing defects are found, and where the manufacturing throughput of SCR's is adversely affected. Yet another difficulty is encountered when analog receiver circuits are integrated into IC's. The disadvantage arises from the need of having to redesign the analog receiver circuit when an IC fabrication process is upgraded to a higher performance fabrication process, e.g., 1 micron to 0.5 micron technology.

In sum, although analog circuits are effective in the design and manufacture of SCR's, their use in SCR's has an adverse affect in manufacturing quality, and is costly when IC fabrication processes are upgraded.

Accordingly, what is needed is a method and apparatus that overcomes the deficiencies of prior art analog receivers. In particular, a method and apparatus is desired that would allow for demodulation and symbol synchronization of a multi-level signal without the drawbacks of prior art analog receivers discussed above. Moreover, an apparatus is desired that would be substantially immune to manufacturing defects, and would be readily portable across different IC fabrication technologies.

BRIEF DESCRIPTION OF THE DRAWINGS

The present invention is pointed out with particularity in the appended claims. However, other features of the invention will become more apparent and best understood by referring to the following detailed description in conjunction with the accompanying drawings in which:

DESCRIPTION OF THE PREFERRED EMBODIMENT

Figure 1:
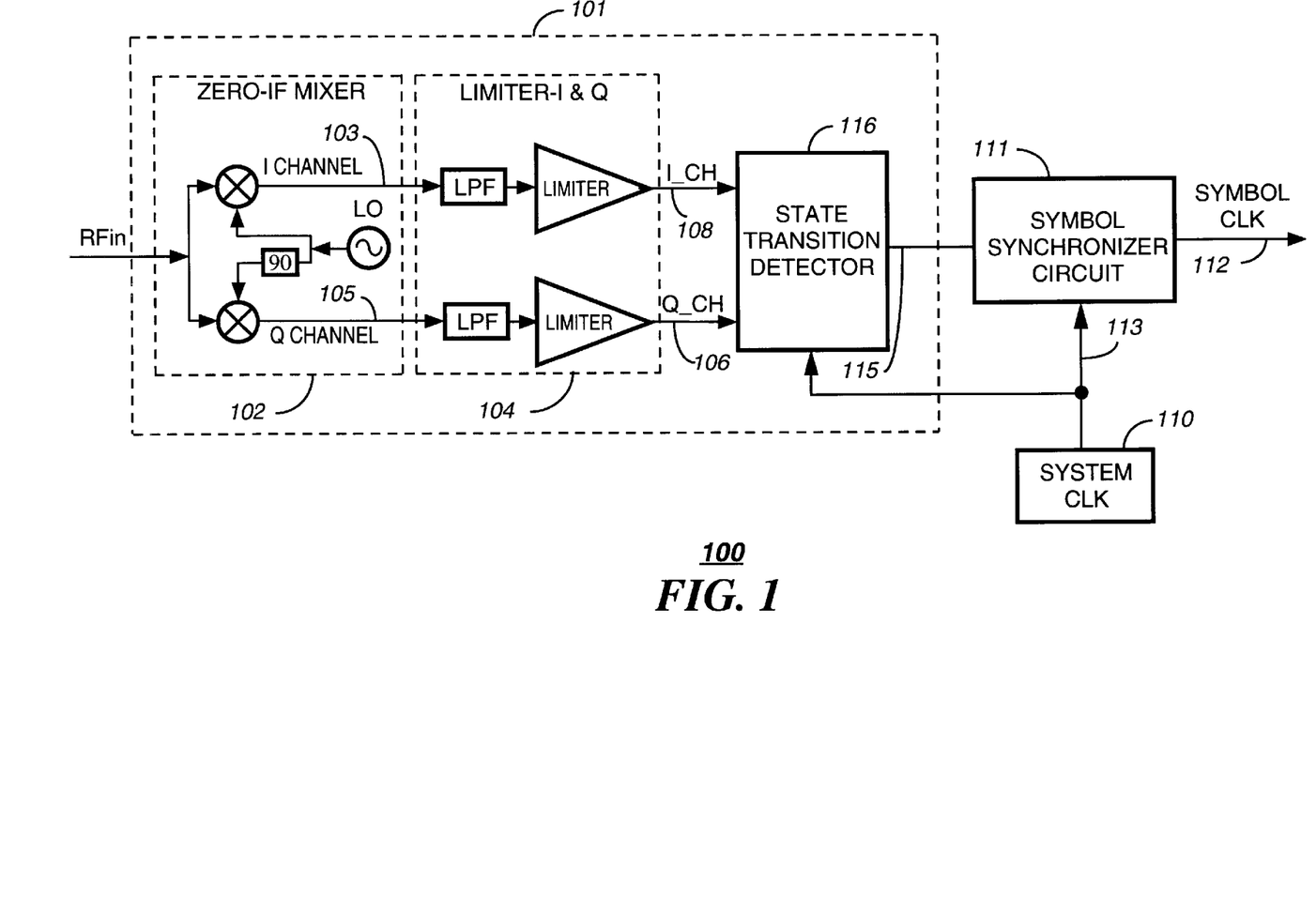
FIG. 1 illustrates an electrical block diagram of a 4-level radio receiver according to the present invention.
Figure 2:
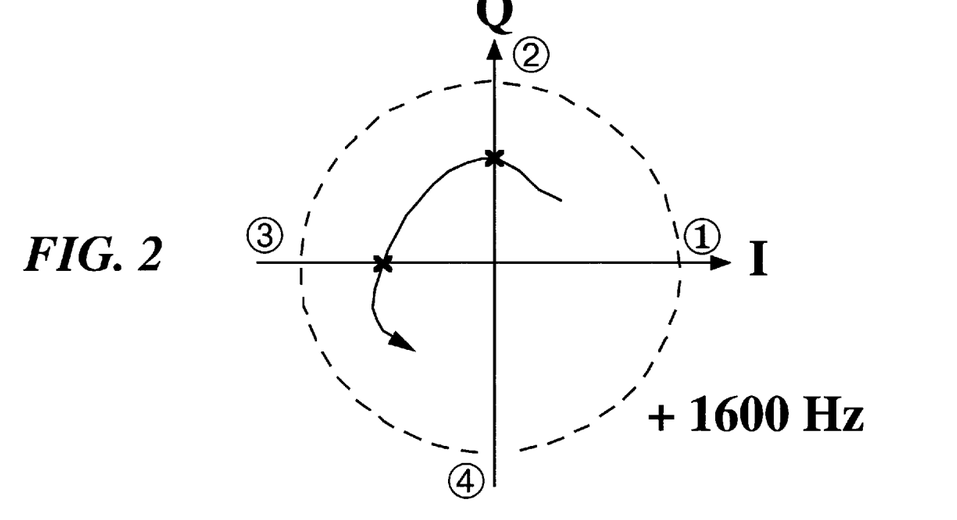
FIGS. 2 through 5 illustrate complex domain graphs of unconditioned in-phase and quadrature signals in a noise-free environment for each deviation of a 4-level FSK (frequency shift keyed) signal.
Figure 3:
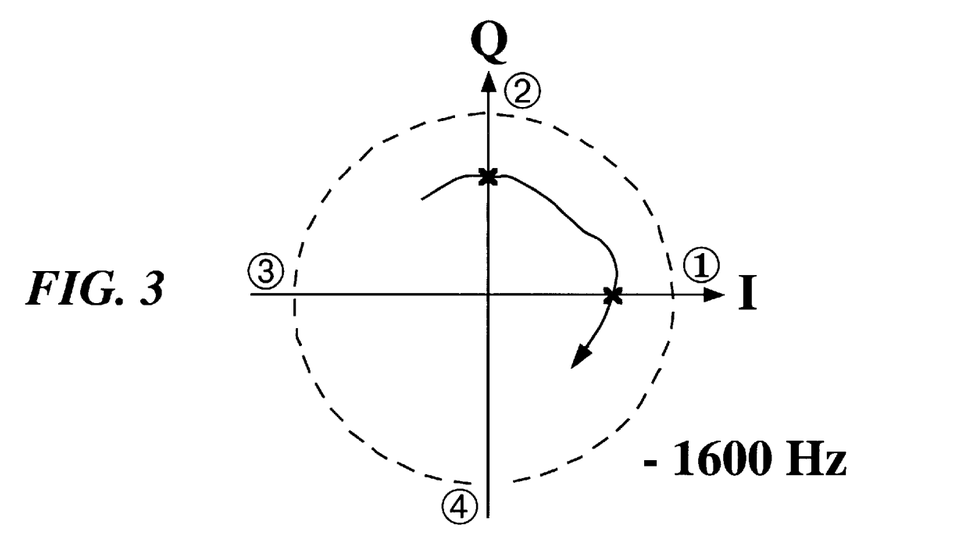
Figure 4:
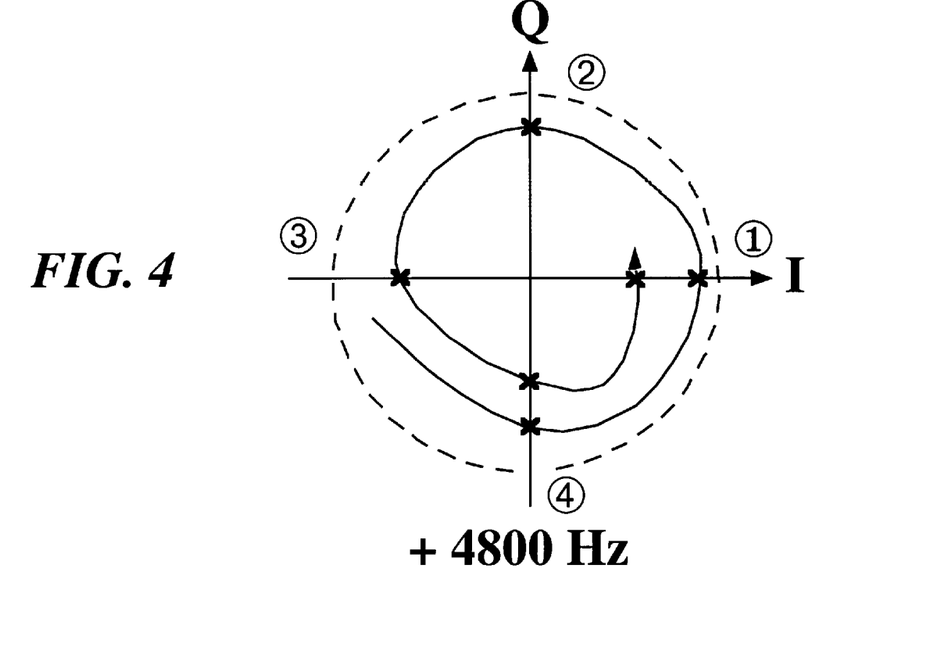
Figure 5:
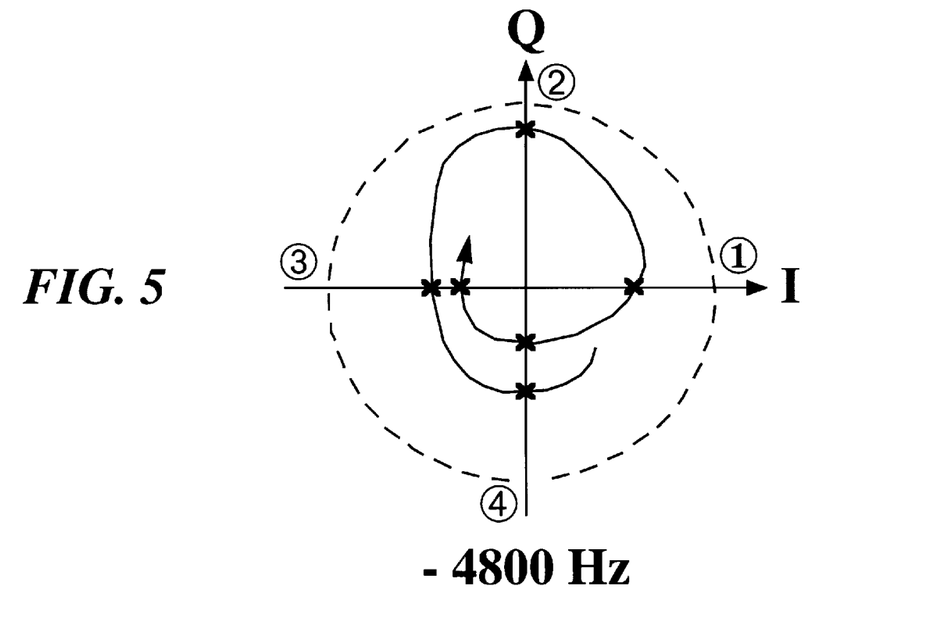

FIG. 1 is an electrical block diagram of a radio receiver 100 according to the present invention. The radio receiver 100 comprises a receiver circuit 101, a symbol synchronizer circuit 111 and a system clock 110. The receiver circuit 101 comprises a zero-IF mixer 102, an I-Q (in-phase and quadrature) limiter circuit 104, and a state transition detector 116. The zero-IF mixer 102 is a conventional non-coherent mixer comprised of in-phase and quadrature mixers driven from a substantially accurate local oscillator (LO) for generating an in-phase signal, and a quadrature signal, respectively. The zero-IF mixer 102 receives preferably an RF-FSK signal (radio frequency shift keyed signal shown as RFin in FIG. 1) from a conventional high frequency antenna (not shown).

It will be appreciated that, alternatively, a conventional front-end mixer circuit such as, for example, a superheterodyne circuit, along with a conventional quadrature mixer can be used in place of the zero-IF mixer 102. The front-end mixer is generally used for receiving FSK signals transmitted by a remote transmitter station at high frequencies (e.g., 900 MHz). After a high frequency FSK signal has been mixed by the front-end mixer circuit, an IF-FSK signal results, e.g., 455 KHz. The IF-FSK signal is then mixed down by quadrature mixers to generate an in-phase signal, and a quadrature signal, respectively.

Focusing on the preferred embodiment, once the zero-IF mixer 102 has mixed down the RF-FSK signal to basedband, the unconditioned in-phase and quadrature signals 103, 105 are then processed by the I-Q limiter circuit 104. The conditioning of these signals is performed by two low-pass filters (LPF) and two limiter circuits connected in tandem, respectively. The LPF's remove adjacent channel interference, while the limiters generate a two-level voltage signal representative of conditioned in-phase and quadrature signals (I_CH, and Q_CH) 108, 106, respectively. To do this, the limiter circuit preferably utilizes a one-bit conventional analog-to-digital converter.

The two-level in-phase and quadrature signals are then processed by a state transition detector 116, which detects transitions between states of the I-Q signals 108, 106 and generates state outputs which are applied to a state transition bus 115. The design and operation of the state transition detector 116 will be discussed in detail shortly. The data provided by the state transition bus 115 is then processed by the symbol synchronizer circuit 111 operating from the system clock 110. The system clock 110 is preferably a conventional clock generator generating a sampling clock signal 113 operating at, e.g., 76.8 KHz.

The symbol synchronizer circuit 111 is used for synchronizing symbol edges of the 4-level FSK signal to an internal reference of the symbol synchronizer circuit 111, thereby generating a symbol clock 112.

The symbol clock 112 is used, for example, by a processor for decoding digital data included in the 4-level FSK signal. The symbol synchronizer circuit 111 will be described shortly.

The reader will appreciate that, alternatively, modulation schemes other than a 4-level FSK signal may be used in the present invention, such as, for example, 4-level QAM (quadrature amplitude modulation) and 4-level PSK (phase shift keying). For illustration purposes only, the discussions that follow are focused on processing a 4-level FSK signal according to the present invention. These discussions should be viewed as being substantially similar to discussions regarding the processing of other 4-level radio signals according to the present invention.

To aid the reader in understanding the operation of the symbol synchronizer circuit 111, a brief discussion of the theory, design, and operation of the state transition detector 116 will be given. Particularly, FIGS. 2 through 5 will be used to introduce the reader to the important principles which are utilized in the design (shown in FIG. 7) of the state transition detector 116 according to the present invention. This discussion is particularly important since data provided by the state transition detector 116 is critical to the operation of the symbol synchronizer circuit 111.

Beginning with FIGS. 2 through 5, these figures are illustrations of complex domain graphs of the unconditioned in-phase and quadrature signals 103, 105 in a noise-free environment for each frequency deviation, respectively, of a 4-level FSK signal. These graphs are presented to illustrate characteristics of the in-phase and quadrature signals that the present invention takes advantage of in demodulating and synchronizing to the symbol edges of a plurality of symbols included in a multi-level FSK signal. The graphs illustrate deviations of ±4800 Hz, and ±1600 Hz from a frequency reference (e.g., 900 MHz carrier). In a complex domain system, the in-phase signal (I) is a signal representing the real part, and the quadrature signal (Q) is signal representing the imaginary part of a complex signal. After plotting the magnitude and phase of these signals in continuous time, the graphs shown in FIGS. 2 through 5 result.

Depending on whether the frequency deviation with respect to a carrier signal is positive or negative, the plotted signals have a clockwise or counter-clockwise direction. In particular, for positive frequency deviations the rotation is counter-clockwise, and for negative frequency deviations the rotation is clockwise. This characteristic of the in-phase and quadrature signals is utilized by the symbol synchronizer circuit 111 to determine symbol synchronization therefrom.

Another characteristic of in-phase and quadrature signals when plotted in a complex system, is that, depending on the frequency of these signals, several rotations may result around the complex domain. Table 1 illustrates an example for a 4-level FSK signal transmitted at 3200 symbols per second (or effectively 6400 bits per second) with frequency deviations of ±4800 Hz, and ±1600 Hz.

TABLE 1

| Symbols @ 3200 symbols/second | Frequency of Deviations | No. of π Rotations @ 3200 symbols/second |
| --- | --- | --- |
| 10 | +4800 Hz | counter-clockwise 3 |
| 11 | +1600 Hz | counter-clockwise 1 |
| 01 | −1600 Hz | clockwise 1 |
| 00 | −4800 Hz | clockwise 3 |

As Table 1 illustrates, a ±4800 Hz frequency deviation rotates by 3π in a counter-clockwise/clockwise direction around the complex domain. A ±1600 Hz frequency deviation rotates π in a counter-clockwise/clockwise direction around the complex domain. This characteristic of the in-phase and quadrature signals is utilized by the symbol synchronizer circuit 111 to locate symbol edges in the plurality of symbols of the 4-level FSK signal.

As noted above, the I-Q limiter circuit 104 conditions the in-phase and quadrature signals into two level signals. As a result, the continuous curves shown in FIGS. 2 through 5 cannot be reproduced. Instead, a digitized representation of the in-phase and quadrature signals remains. These digitized points of data occur only on the I and Q axes (shown as "x's" on these figures). For the present invention, these crossings of the I and Q axes are defined as state transitions.

Figure 8:
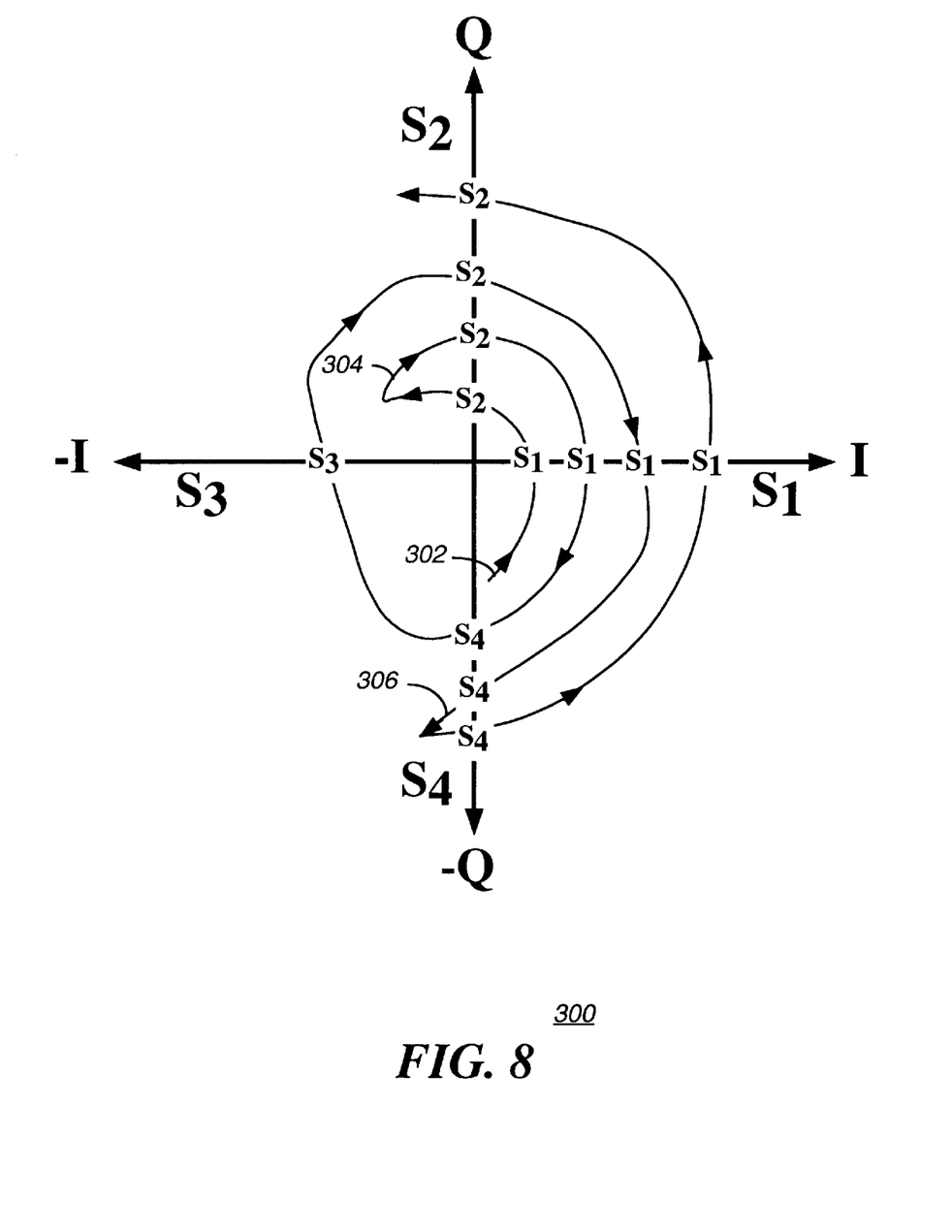
FIG. 8 illustrates a complex domain graph of a 4-level FSK signal with data transmitted at a baud rate of 3200 sps (symbols per second), and with a sequence of frequency deviations conforming to transitions from +1600 Hz to −4800 Hz to +1600 Hz.

As it will be illustrated in FIG. 8, the symbol synchronizer circuit 111 locates symbol edges by accounting for same state transitions in any of the four quadrants of the I-Q complex domain. This is accomplished by monitoring a sequence of state transitions. A sequence of state transitions, is defined as a sequence of transitions between states.

Figure 6:
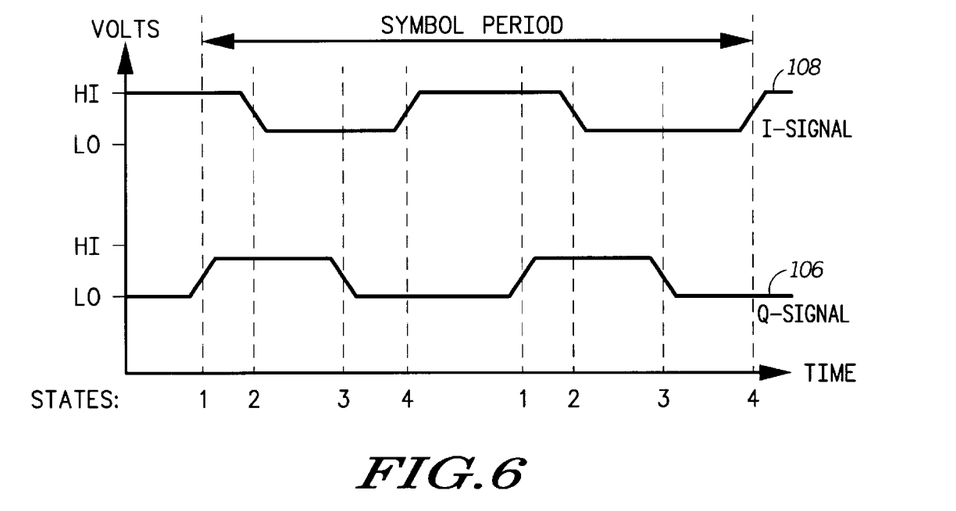
FIG. 6 depicts a sequence of state transitions of conditioned in-phase and quadrature signals.

FIG. 6 is an illustration depicting a sequence of state transitions of the conditioned in-phase and quadrature signals 108, 106. Note that the conditioned in-phase and quadrature signals 108, 106 (referred to herein as I-Q signals 108, 106) differ from the unconditioned in-phase and quadrature signals 103, 105 in that the former signals 108, 106 are digitized while the latter signals 103, 105 are not. This results in the square waveforms shown in FIG. 6 as opposed to sinusoidal waveforms representative of the unconditioned in-phase and quadrature signals 103, 105 (not shown). In determining the present state of the I-Q signals 108, 106, the state transition detector 116 monitors each edge transition (rising-edge or falling-edge) of the I-Q signals 108, 106 over a symbol period.

In the example shown in FIG. 6, the first rising-edge of the Q signal occurs while the I signal is HI. This represents state 1 in the complex domain system (i.e., the positive I axis; see FIGS. 2 and 3). The next signal to switch levels is the I signal (falling-edge). During this edge transition the Q signal is HI representative of state 2 (i.e., the positive Q axis). Note the transition from state 1 to state 2 represents one sequence of a state transition. The next signal to switch is the Q signal (falling-edge). During this edge transition the I signal is LO, representative of state 3 (i.e., the negative I axis). Finally, the I signal switches from LO to HI. During this edge transition the Q signal is LO representative of state 4 (i.e., the negative Q axis). The four edge transitions that follow represent a repetition of states 1–4 as depicted in FIG. 6.

By tracking the sequence of state transitions by way of the state transition detector 116, the symbol synchronizer circuit 111 determines the location of symbol edges, thereby allowing for accurate decoding of the 4-level FSK signal by, for example, a conventional processor. With an accurate symbol clock 112, a processor can decode digitized symbols according to the data shown in Table 1.

Figure 7:
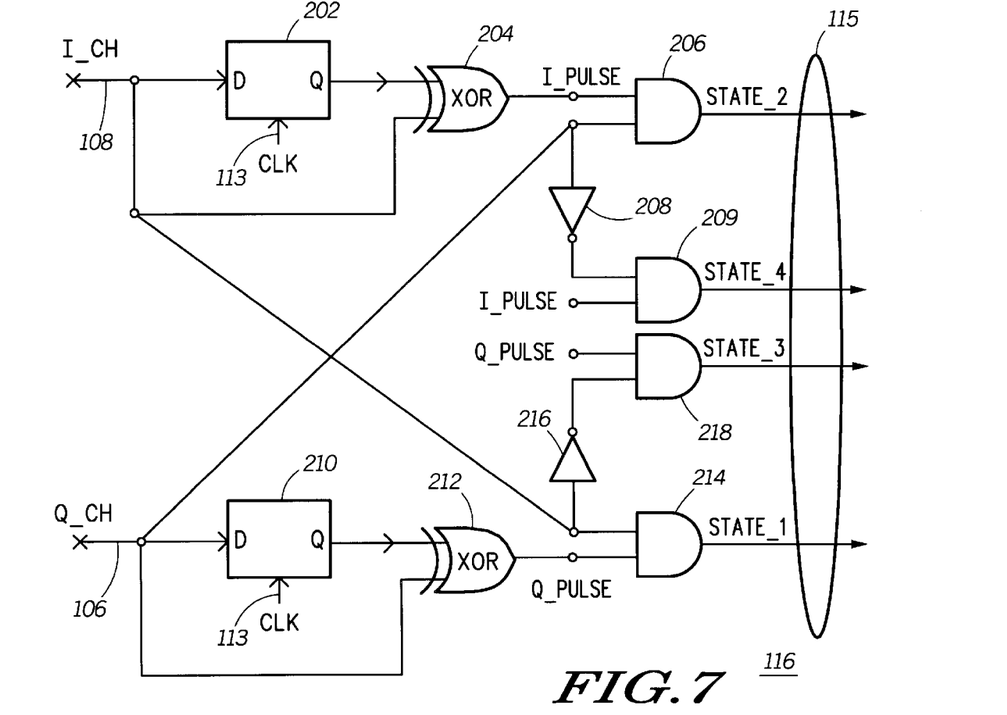
FIG. 7 illustrates an electrical block diagram of a state transition detector according to the present invention.

FIG. 7 is an electrical block diagram of a state transition detector 116 according to the present invention. As should be evident from the discussions above, the purpose of the state transition detector 116 is to detect transitions between states of the I-Q signals 108, 106.

The state transition detector 116 comprises two D Flip-Flops 202, 210, two Exclusive OR gates 204, 212, four AND gates 206, 209, 218, 214, and two inverters 208, 216. The state transition detector 116 receives as input the conditioned I-Q signals 108, 106 (as illustrated in FIG. 6). The D Flip-Flops 202, 210, which sample the I-Q signals 108, 106, are clocked by the sampling clock signal 113 that is several times faster than the rate of the I-Q signals 108, 106 (e.g., 76.8 KHz). The combination of the D Flip-Flop 202 and the X'OR 204 serves to detect a transition of the I signal. Similarly, the combination of the D Flip Flop 210 and X'OR 212 serves to detect a transition of the Q signal. When a transition is detected, these circuits generate an I_PULSE and a Q_PULSE, respectively, and the four AND gates 206, 209, 218, 214 in combination with the two inverters 208, 216 serve as state decoders.

For example, assume that the I signal 108 experiences a falling-edge transition, and during that transition the Q signal 106 is high. The falling-edge transition is going to be detected by the combination D Flip-Flop 202, and the X'OR 204, thereby generating a positive pulse, I_PULSE (the pulse duration is approximately one cycle of the sampling clock signal 113). The I_PULSE is then received by both AND gates 206 and 209. AND gate 206 then generates an output representative of state 2 when it detects the I_PULSE and when the Q signal 106 is HI (i.e., the condition for state 2). Similarly, AND gate 209 generates an output representative of state 4 when it detects the I_PULSE and when the Q signal 106 is LO (i.e., the condition for state 4).

The signal generated by AND gate 206 has a duration approximately equal to the duration of I_PULSE. The other state decoders operate in a similar manner as just described. These state outputs (i.e., states 1–4) are applied to a state transition bus 115, which is utilized by an algorithmic state machine of the symbol synchronizer circuit 111 for tracking transitions between states.

FIG. 8 illustrates a complex domain graph of a 4-level FSK signal with data transmitted at a baud rate of 3200 sps (symbols per second), and with a sequence of frequency deviations conforming to transitions from +1600 Hz to −4800 Hz to +1600 Hz. Beginning with the inner most loop 302 of the graph depicted in FIG. 8, a +1600 Hz frequency deviation results in a graph wherein the phasor (representative of the signal shown in the graph) travels a distance of $\pi$ radians in a counter-clockwise direction, thereby crossing the positive I axis and the positive Q axis depicted by states S1 and S2, respectively. Upon switching to a frequency deviation of −4800 Hz, the phasor (creating the resulting graph 304) travels a distance of $3\pi$ radians in a clockwise direction, thereby crossing the I and Q axes according to the sequence S2, S1, S4, S3, S2, S1 and S4. Finally, upon switching back to a frequency deviation of +1600 Hz the phasor (creating the resulting graph 306) travels a distance of $\pi$ radians in a counter-clockwise direction, thereby resulting in the sequence of states S4, S1 and S2.

Referring back to Table 1, the sequence of symbols represented by the sequence of frequency deviations illustrated in FIG. 8 results in the digital sequence "11" (+1600 Hz frequency deviation), "00" (−4800 Hz frequency deviation) and "11" (+1600 Hz frequency deviation).

Figure 9:
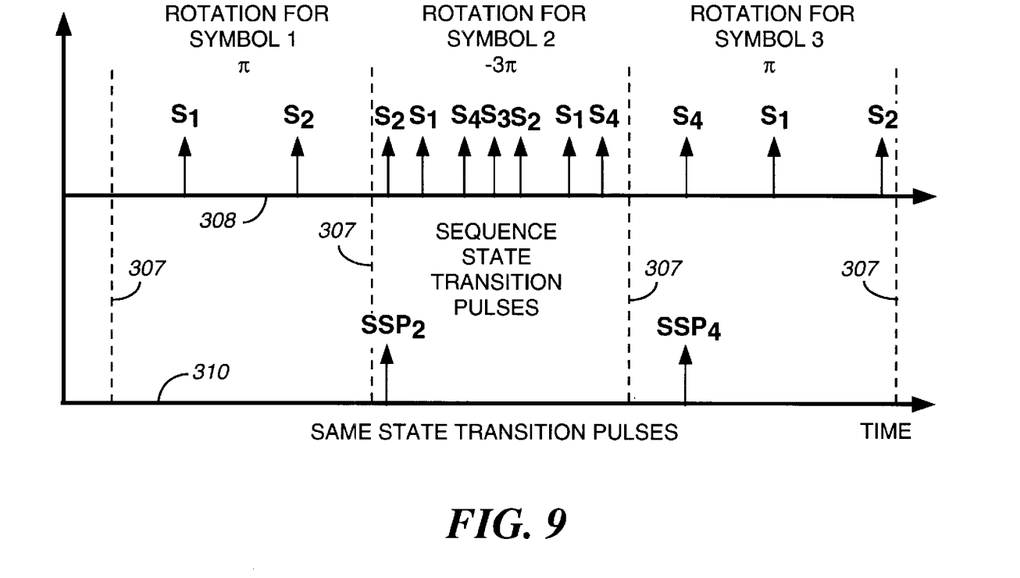
FIG. 9 illustrates the sequence of state transitions depicted in FIG. 8.

FIG. 9 illustrates the sequence of state transitions depicted by the graph shown in FIG. 8. The dashed vertical lines 307 represent the symbol edges of the sequence of symbols (identified as symbols 1–3, by way of example) represented by the graph shown in FIG. 8. From the sequence shown in graph 308, it should be evident that the same state (or repeated) transitions S2 and S4 indicate the location of the symbol edges with varying accuracy. To illustrate this point, the graph 310 shown below depicts same state pulses (SSP2 and SSP4) which are representative of the second occurrence of the same state transitions S2 and S4, respectively.

As should be apparent from the second graph 310, SSP2 is closer in time to the occurrence of the symbol edge than is SSP4. This is because SSP2 occurs as a result of a fast phasor (representative of a 4800 Hz frequency deviation) while SSP4 occurs as a result of a slow phasor (representative of a 1600 Hz frequency deviation). Assuming that the sampling clock signal 113 operates at 76.8 KHz and that the baud rate of the 4-level FSK signal is 3200 sps, each symbol will comprise twenty-four samples (i.e., 76.8K/3200). Since a 4800 Hz frequency deviation has $3\pi$ rotations or equivalently travels six quadrants about the I-Q complex domain, each quadrant will comprise four samples. In contrast, a 1600 Hz frequency deviation has $\pi$ rotations or equivalently travels two quadrants about the I-Q complex domain, thereby resulting in twelve samples per quadrant.

Since a symbol edge may occur in any location within a quadrant, and since the accuracy of the state transition detector 116 is quantized to state transitions of the I and Q axes, estimation of the symbol edge is dependent on which sample is selected in a particular quadrant where the same state transitions occurred. Since there are only four samples per quadrant for a 4800 Hz frequency deviation, selecting any of the four samples as an estimation of the symbol edge results in a worse case offset from an actual symbol edge of four samples, or approximately 52 micro-seconds (4 samples÷76.8 KHz sampling rate). In the case of a 1600 Hz frequency deviation, selecting from any one of 12 samples as an estimation of a symbol edge could result in a worse case offset from an actual symbol edge of 12 samples, or 156 us (micro-seconds). Clearly, using samples from a 4800 Hz frequency deviation versus a 1600 Hz frequency deviation results in a substantially more accurate estimation of an actual symbol edge as is made apparent from the closeness of SSP2 to the actual symbol edge in graph 310.

To further increase the accuracy of estimating a symbol edge using a sample from a 4800 Hz frequency deviation, a sample closest to a midpoint of a quadrant of interest is selected. This results in the selection of a sample that is two samples away from the I or Q axes where a same state transition is detected. As a result of choosing the mid point of a quadrant, the worse case offset from an actual symbol edge is never greater than two samples or equivalently 26 us. Hence, in this example the worse case error for sample of a 4800 Hz frequency deviation is 8.3% (2 sample offset÷24 samples per symbol * 100%).

In sum, FIG. 9 illustrates how an SSP (same state pulse) can be used for estimating the location of symbol edges in a plurality of symbols included in a 4-level FSK signal. Although SSP's in a noise free environment could be used for detecting symbol edges in a 4-level FSK signal, several practical problems must be resolved. First, a method must be derived for filtering SSP's caused by noise in a multi-level radio signal. Second, a method must be derived for detecting a desirable sequence of frequency deviations. Each of these problems and their respective solutions will be discussed based on the illustrations of FIGS. 10 and 11.

Figure 10:
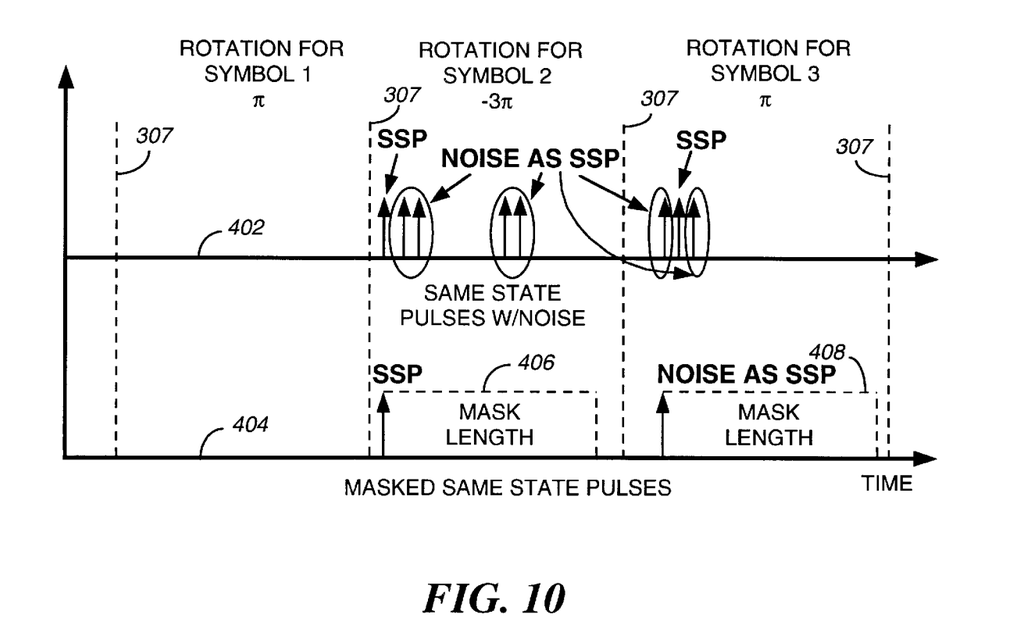
FIG. 10 illustrates a mask-out window for masking out same state pulses caused by noise according to the present invention.

FIG. 10 illustrates a solution to the first problem. Graph 402 shows the situation where inadvertent SSP's may be created by noise in the 4-level FSK signal. To eliminate SSP's caused by noise, mask-out windows 406, 408 are used. In a preferred embodiment of the present invention, the mask-out windows select a first SSP occurring during a symbol period, and eliminate subsequent SSP's occurring during the symbol period as illustrated in graph 404. This method of masking out erroneous SSP's is a first order approximation, wherein the first SSP detected is assumed to be a valid SSP and subsequent SSP's are assumed to be erroneous. Although this first order approximation may at times be erroneous itself (see the case where a valid SSP was masked out by 408), it is self correcting over a plurality of symbols. That is, if there are enough valid SSP's over a plurality of symbols, this first order approximation will eventually lock on to a valid SSP.

The mask-out window plays the essential role of limiting the number of SSP's that are used in the synchronization process. This is an important function since without it, estimating a symbol edge could lead to a jittered symbol clock 112. The reader should appreciate that, alternatively, other algorithms suitable to the present invention may be used for masking out suspected erroneous SSP's.

Figure 11:
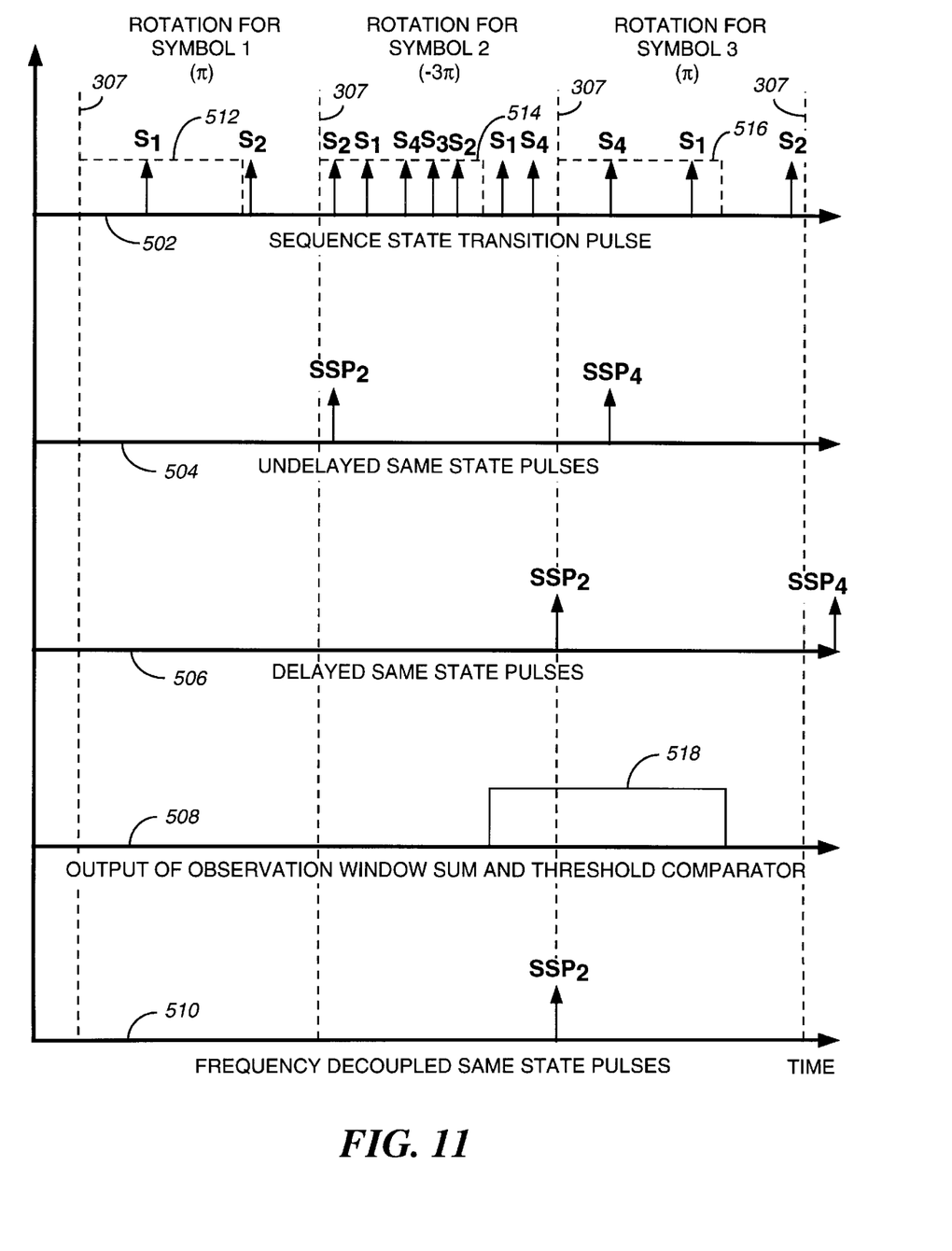
FIG. 11 illustrates the process of generating a same state pulse which substantially approximates the location of symbol edges in a plurality of symbols in a 4-level FSK signal according to the present invention.

FIG. 11 illustrates the second problem discussed above. That is, the problem of distinguishing between a desired and an undesired sequence of frequency deviations. A desirable sequence of frequency deviations is defined as any sequence of frequency deviations ending with a fast frequency deviation having a predetermined value and of opposite polarity to the first frequency deviation. For example, the following are desirable sequences of frequency deviations based on the 4-level FSK signal discussed above: +1600 Hz to −4800 Hz, −1600 Hz to +4800 Hz, −4800 Hz to +4800 Hz, and +4800 Hz to −4800 Hz. The following are examples of undesirable sequences of frequency deviations: +1600 Hz to −1600 Hz, −1600 Hz to +1600 Hz, −4800 Hz to +1600 Hz, +4800 Hz to −1600 Hz, etc. Note also that any sequence of frequency deviations that do not include a transition between opposite polarities (i.e., "+" to "+", or "−" to "−") are considered an undesirable sequence of frequency deviations also.

The graphs 502–510 illustrate how a desirable sequence of frequency deviations is derived. Graph 502 shows the sequence of state transitions (or pulses) which are representative of the graph shown in FIG. 8. Additionally, during each symbol period (encompassed between boundaries 307), a sample window is used for detecting a sequence of state transitions. The sample window is applied to each of the plurality of symbols for counting the number of state transitions (or pulses) included therein for a predetermined time to determine when a desirable frequency deviation has occurred.

When the number of state transitions counted is less than a predetermined number of states, then it is assumed that a slow frequency deviation is present, as shown in the case of the sample windows 512, 516. If, however, the number of state transitions counted is greater than or equal to a predetermined number of states (e.g., 3 state pulses), then it is assumed that a fast frequency deviation is present, as shown in the case of the sample window 514. This determination is used for generating a mask-in window 518 (shown in graph 508) for selecting a desirable SSP from the plurality of SSP's effected by a desirable sequence of frequency deviations in the 4-level FSK signal.

To understand the positioning of the mask-in window 518, the reader's attention is directed to graphs 504, 506. Graph 504 illustrates the generation of SSP's 2 and 4, respectively, according to the sequence of state transitions shown in graph 502. As the reader may recall, SSP2 is an SSP which is a substantially better estimate of symbol edges of the 4-level FSK signal than SSP4. Moreover, the reader may recall that each quadrant of an I-Q complex domain has four samples for a 4800 Hz frequency deviation operating at a data rate of 3200 sps, and that the midpoint (or equivalently the second sample from a same state transition axis) is the preferred sample point for minimal offset to a symbol edge. Since this adjustment cannot be done at the time that SSP2 and SSP4 are generated under a causal system, the adjustment of SSP2 and SSP4 is done at the next symbol period.

This adjustment is shown in graph 506. That is, SSP2 and SSP4 are delayed by one symbol period less a predetermined offset, which in the present example is preferably two samples. The SSP's in graph 506 are then filtered by the mask-in window 518 shown in graph 508. Consequently, since SSP2 is the only SSP which occurs during the mask-in window 518, it is the only valid SSP generated (as shown in graph 510) for synchronizing the internal reference of the symbol synchronizer circuit 111 discussed earlier.

Figure 12:
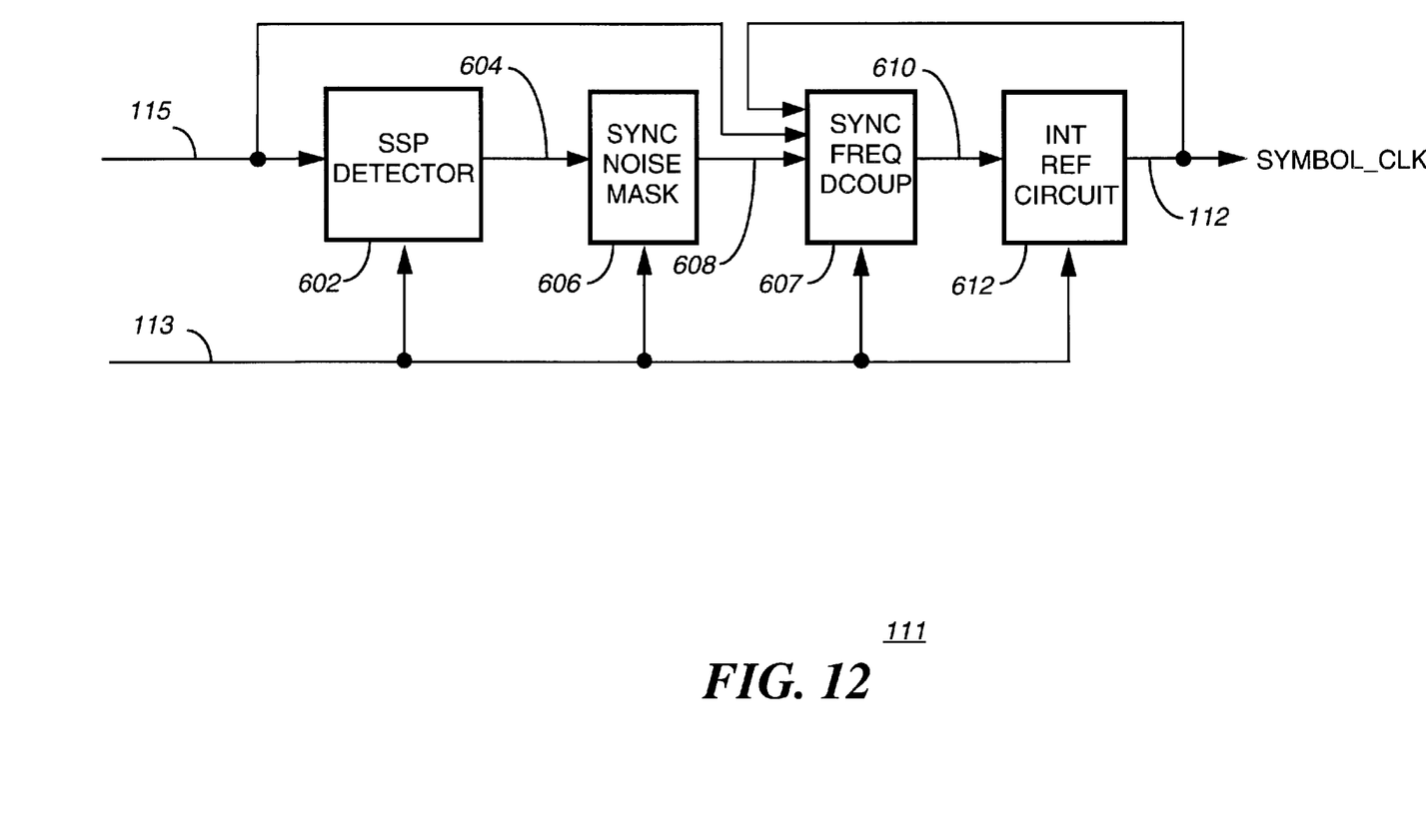
FIG. 12 illustrates an electrical block diagram of the symbol synchronizer circuit depicted in FIG. 1 according to the present invention.

FIG. 12 illustrates an electrical block diagram of the symbol synchronizer circuit 111 depicted in FIG. 1 according to the present invention. The symbol synchronizer circuit 111 comprises an SSP detector 602, a sync noise mask 606, sync frequency decoupler 607 and an internal reference circuit 612. Each of these circuits is preferably implemented with conventional algorithmic state machines and are synchronized by the sampling clock 113. The SSP detector 602 is used for detecting same state transitions in the state outputs received from the state transition bus 115 coupled thereto. Upon detecting a same state transition, the SSP detector 602 generates an SSP signal 604 which is received and processed by the sync noise mask 606.

The sync noise mask 606, as functionally illustrated in FIG. 10, is used for filtering out SSP's caused by noise in the 4-level FSK signal. As noted earlier, the sync noise mask 606 preferably selects a first SSP received from the SSP signal 604 and filters subsequently received SSP's according to the mask-out windows 406, 408, thereby generating a filtered SSP signal 608. It will be appreciated that, alternatively, other algorithms suitable to the present invention for filtering out SSP's caused by noise in a multi-level radio signal may be used.

The sync frequency decoupler 607 performs the functions illustrated in FIG. 11. To do this, the sync frequency decoupler 607 is coupled to the state transition bus 115, the filtered SSP signal 608 and the symbol clock 112 generated by the internal reference circuit 612. The state transition bus 115 and the symbol clock 112 are used by the sync frequency decoupler 607 for receiving state transition information and for determining the position of the sampling windows 512, 514. As a result, the sync frequency decoupler 607 determines the timing of the mask-in window 518 for generating a desired SSP signal 610 (shown by way of example as SSP2 in graph 510 of FIG. 11).

The internal reference circuit 612 is preferably implemented with an algorithmic state machine (ASM) functioning as a free-running counter that operates from the sampling clock 113. In the present example, the sampling clock 113 operates at 76.8 KHz and the 4-level FSK signal operates at a baud rate of 3200 sps. Based on these operating parameters, there are twenty-four samples per symbol period (i.e., 76.8K÷3200). Consequently, the free-running counter preferably has twenty-four clock states and operates to generate a transition on the symbol clock 112 every cycle of the counter. Additionally, the free-running counter is programmed to be periodically phase synchronized by the desired SSP signal 610. It will be appreciated that, alternatively, a 2-level FSK signal operating at 1600 sps with frequency deviations at ±4800 Hz may be used. In that case, there are forty-eight samples per symbol period (i.e., 76.8K÷1600). Accordingly, the free-running counter would have forty-eight clock states. The present example, however, will focus on a 4-level FSK signal operating at 3200 sps.

In a preferred embodiment, this synchronization is accomplished by programming the ASM to adjust the free-running counter by advancing or delaying it by a predetermined adjustment factor based on the polarity of the error measured between the timing of the desired SSP signal 610 and the symbol clock 1120 In the present example, the predetermined adjustment factor is preferably equal to one clock cycle of the sampling clock 113. The reason for advancing or delaying the counter only by one clock cycle as opposed to the actual error measured (e.g., four clock cycles) is to dampen any noise effects that were not adequately filtered by the sync noise mask 606 and/or the sync frequency decoupler 607, thereby reducing the possibility of a jittered symbol clock 112. Alternatively, if it is well known that noise levels are expected to be minimal in the communication environment where the radio receiver 100 is to operate, the ASM of the internal reference circuit 612 may be programmed for immediate adjustment, thereby providing a fast phase adjustment.

Figure 13:
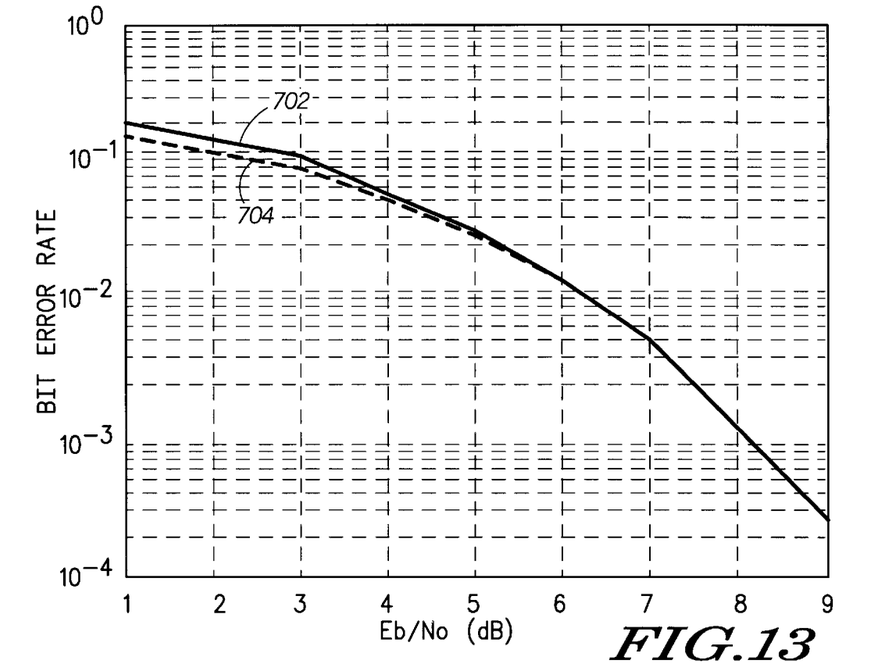
FIGS. 13 and 14 illustrate the performance of the symbol synchronizer circuit depicted in FIG. 1 according to the present invention.
Figure 14:
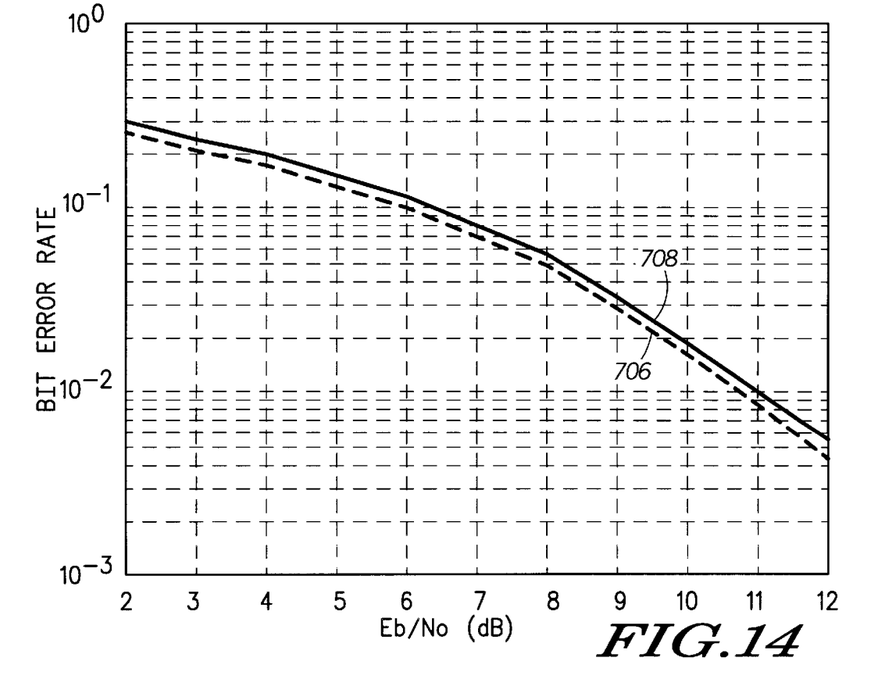

FIGS. 13 and 14 illustrate the performance of the symbol synchronizer circuit 111 depicted in FIG. 1 according to the present invention. FIG. 13 illustrates the performance the symbol synchronizer circuit 111 for a 1600 sps, 2-level FSK signal based on bit error rate as a function of signal-to-noise ratio (Eb/No in dB). The dashed curve 704 represents an ideal non-realizable performance curve modeled on a communication environment having a Gaussian noise distribution. The solid curve 702 is representative of the actual performance of the symbol synchronizer circuit 111. As should be evident from the graph, the actual performance of the symbol synchronizer circuit 111 illustrates that the present invention performs with minimal degradation over a large signal-to-noise range. FIG. 14 illustrates a similar performance for a 4-level FSK signal operating at 3200 sps.

Figure 15:
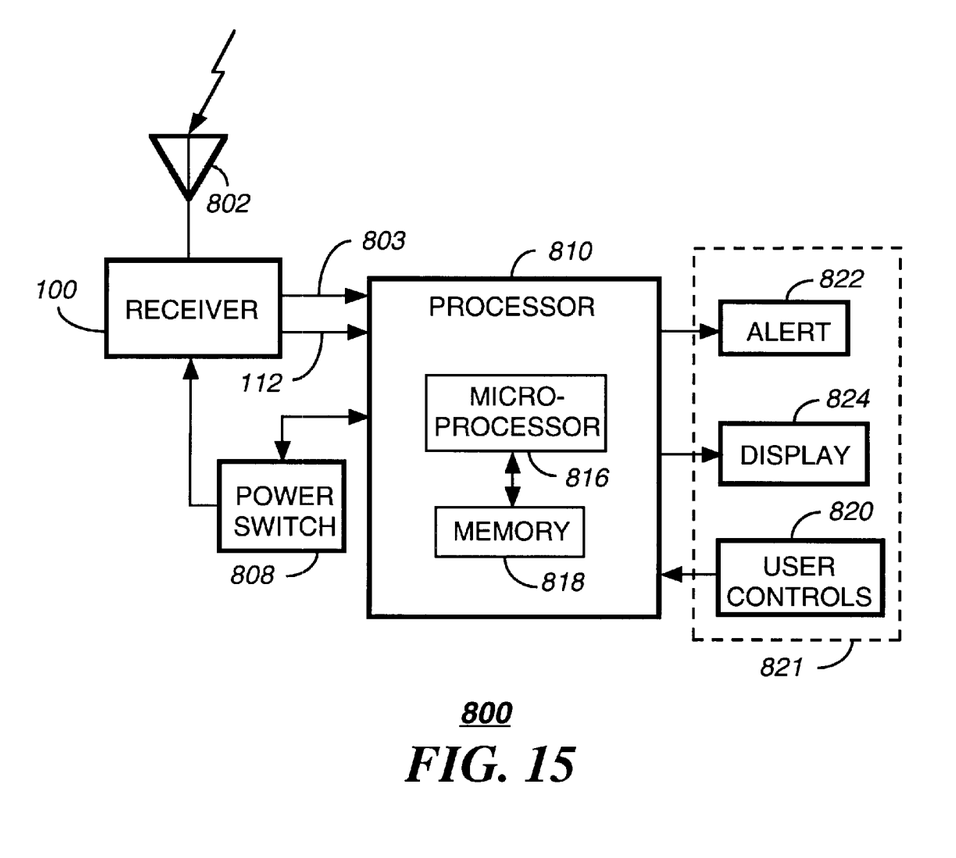
FIG. 15 illustrates an electrical block diagram of a selective call receiver utilizing the radio receiver of FIG. 1 according to the present invention.

FIG. 15 is an electrical block diagram of a selective call receiver (SCR) 800 utilizing the radio receiver 100 according to the present invention. The SCR 800 comprises the radio receiver 100 described above coupled to a conventional antenna 802, a power switch 808, a processor 810, and a user interface 821. The radio receiver 100 and antenna 802 are utilized for receiving 4-level FSK signals that include messages transmitted by a radio communication system. The radio receiver 100 generates a demodulated signal 803 and a symbol clock 112, which is used by the processor 810 for decoding digital data therefrom. Based on the digital data decoded, the processor 810 is programmed to reject or accept the 4-level FSK signal.

The power switch 808 is a conventional switch, such as a MOS (metal oxide semiconductor) switch for controlling power to the radio receiver 100 under the direction of the processor 810, thereby providing a battery saving function.

The processor 810 controls operation of the SCR 800, generally having the primary function of decoding and processing demodulated messages provided by the radio receiver 100 based on the symbol clock 112, storing them and alerting a user of the received message. To perform this function, the processor 810 comprises a conventional microprocessor 816 coupled to a conventional memory 818 having nonvolatile and volatile memory portions, such as a ROM (read-only memory) and RAM (random-access memory). One of the uses of the memory 818 is for storing messages received from the radio communication system. Another use is for storing one or more selective call addresses utilized in identifying incoming personal or group messages to be intercepted by the SCR 800.

Once a message has been decoded and stored in the memory 818, the processor 810 activates the alerting device 822 (included in the user interface 821) which generates a tactile and/or audible alert signal to the user. The user interface 821, which further includes, for example, a conventional LCD display 824 and conventional user controls 820, is utilized by the user for processing the received messages. This interface provides options such as reading, deleting, and locking of messages.

To communicate messages to the SCR's 800, the radio communication system preferably utilizes a protocol such as the FLEX protocol, developed by Motorola, Inc. (FLEX is a trademark of Motorola, Inc.) for transmitting synchronous messages. The FLEX protocol is a digital selective call signaling protocol that is presently used by various system operators in the United States and in several other countries. It will be appreciated that, alternatively, other signaling protocols that are suitable to the present invention can be used.

In an alternative embodiment, certain functions of the radio receiver 100 are implemented in software with the use of the processor 810. In particular, the functions of the state transition detector 116 and the symbol synchronizer circuit 111 are integrated in software, which is operated by the processor 810. Under this embodiment, the processor 810 includes an internal reference and is adapted to cause the receiver circuit 101 (excluding the state transition detector 116) to demodulate the multi-level radio signal to in-phase and quadrature signals 108, 106, to convert the I-Q signals 108, 106 to a sequence of state transitions representative of the plurality of symbols and to detect at least one same state transition (i.e., SSP) from the sequence of state transitions. From this information, processor 810 is adapted to synchronize its internal reference to the at least one symbol edge of the plurality of symbols based on the at least one same state transition according to the algorithms described above and illustrated in FIGS. 9–11. Thereafter, the processor 810 is programmed to decode digital data from the 4-level FSK signal.

The processing just described is preferably performed over a synchronization pattern embedded in the FLEX protocol (e.g., a comma pattern—alternating "1's" and "0'" pattern) used by the communication system for communicating with SCR's 800. Once synchronization has been completed according to the operation described above for the symbol synchronizer 111, the processor 810 proceeds to decode digital data therefrom.

In sum, the present invention provides several advantages to prior art symbol synchronizer circuits. First, the implementation of the present invention is primarily a digital circuit, thereby providing a high degree of manufacturability, low cost and low power consumption. Moreover, because the state transition detector 116 and the symbol synchronizer circuit 111 can be implemented in software, a substantial degree of flexibility can be designed into SCR's 800 utilizing the present invention. For example, under conditions of extreme noise, the symbol synchronizer circuit 111 can be programmed to ignore a received radio signal, and maintain a hold state on the symbol clock 112.

Although the invention has been described in terms of a preferred embodiment it will be obvious to those skilled in the art that many alterations and variations may be made without departing from the invention. Accordingly, it is intended that all such alterations and variations be considered as within the spirit and scope of the invention as defined by the appended claims.

What is claimed is:

1. In a selective call receiver having an internal reference, a method for synchronizing the internal reference to at least one symbol edge of a plurality of symbols included in a multi-level radio signal received from a radio communication system, the method comprising the steps of:
   converting the multi-level radio signal to a sequence of state transitions representative of the plurality of symbols;
   detecting at least one same state transition from the sequence of state transitions; and
   synchronizing the internal reference to the at least one symbol edge of the plurality of symbols based on the at least one same state transition.

2. The method as recited in claim 1, wherein the step of synchronizing the internal reference according to the at least one same state transition is based on adjusting the internal reference by a predetermined adjustment factor.

3. The method as recited in claim 1, further comprising the step of using a mask-out window for each of the plurality of symbols for eliminating same state transitions in the sequence of state transitions caused by noise in the multi-level radio signal.

4. The method as recited in claim 3, wherein the mask-out window selects a same state transition occurring during a symbol period, and eliminates subsequent same state transitions occurring during the symbol period.

5. The method as recited in claim 1, further comprising the step of using a mask-in window for each of the plurality of symbols for selecting a desirable same state transition from the sequence of state transitions effected by a desirable sequence of frequency deviations in the multi-level radio signal.

6. The method as recited in claim 5, wherein the mask-in window is applied when the sequence of state transitions counted within a predetermined time indicates a presence of a desirable frequency deviation in the multi-level radio signal.

7. The method as recited in claim 5, further comprising the step of delaying the desirable same state transition one symbol period less a predetermined offset.

8. The method as recited in claim 5, wherein frequency deviations have polarities with respect to a frequency reference, and wherein the desirable sequence of frequency deviations comprises a first frequency deviation transitioning to a second frequency deviation having an opposite polarity to the first frequency deviation and having a magnitude of deviation greater than a predetermined value.

9. In a selective call receiver having an internal reference, a method for synchronizing the internal reference to at least one symbol edge of a plurality of symbols included in a multi-level radio signal received from a radio communication system, the method comprising the steps of:
   converting the multi-level radio signal to a sequence of state transitions representative of the plurality of symbols;
   detecting a first plurality of same state transitions from the sequence of state transitions;
   using a mask-out window for generating a second plurality of same state transitions, wherein the mask-out window is applied to each of the plurality of symbols for eliminating same state transitions in the first plurality of same state transitions caused by noise in the multi-level radio signal;
   using a mask-in window for generating a third plurality of same state transitions, wherein the mask-in window is applied to each of the plurality of symbols for selecting a desirable same state transition from the second plurality of same state transitions effected by a desirable sequence of frequency deviations in the multi-level radio signal; and
   synchronizing the internal reference to the at least one symbol edge of the plurality of symbols based on the third plurality of same state transitions.

10. In a selective call receiver having an internal reference, a method for synchronizing the internal reference to at least one symbol edge of a plurality of symbols included in a multi-level radio signal received from a radio communication system, the method comprising the steps of:
   converting the multi-level radio signal to a sequence of state transitions representative of the plurality of symbols;
   detecting a first plurality of same state transitions from the sequence of state transitions;
   using a mask-out window for generating a second plurality of same state transitions,
      wherein the mask-out window is applied to each of the plurality of symbols for eliminating same state transitions in the first plurality of same state transitions caused by noise in the multi-level radio signal, and
      wherein the mask-out window selects a first same state transition occurring during a symbol period, and eliminates subsequent same state transitions occurring during the symbol period;
   using a mask-in window for generating a third plurality of same state transitions, wherein the mask-in window is applied to each of the plurality of symbols for selecting a desirable same state transition from the second plurality of same state transitions effected by a desirable sequence of frequency deviations in the multi-level radio signal, wherein frequency deviations have polarities with respect to a frequency reference, and wherein the desirable sequence of frequency deviations comprises a first frequency deviation transitioning to a second frequency deviation having an opposite polarity to the first frequency deviation and having a magnitude of deviation greater than a predetermined value, and wherein the mask-in window is applied when the sequence of state transitions counted within a predetermined time indicates a presence of a desirable frequency deviation in the multi-level radio signal;

delaying the third plurality of same state transitions one symbol period less a predetermined offset; and synchronizing the internal reference to the at least one symbol edge of the plurality of symbols based on the delayed third plurality of same state transitions.

11. A radio receiver, comprising:
a receiver circuit for receiving a multi-level radio signal having a plurality of symbols transmitted by a radio communication system; and
a symbol synchronizer circuit having an internal reference, the symbol synchronizer circuit coupled to the receiver circuit, and adapted to:
cause the receiver circuit to convert the multi-level radio signal to a sequence of state transitions representative of the plurality of symbols;
detect at least one same state transition from the sequence of state transitions; and
synchronize the internal reference to at least one symbol edge of the plurality of symbols based on the at least one same state transition.

12. The radio receiver as recited in claim 11, wherein synchronizing the internal reference according to the at least one same state transition is based on adjusting the internal reference by a predetermined adjustment factor.

13. The radio receiver as recited in claim 11, wherein the symbol synchronizer circuit is further adapted to use a mask-out window for each of the plurality of symbols for eliminating same state transitions in the sequence of state transitions caused by noise in the multi-level radio signal.

14. The radio receiver as recited in claim 13, wherein the mask-out window selects a same state transition occurring during a symbol period, and eliminates subsequent same state transitions occurring during the symbol period.

15. The radio receiver as recited in claim 11, wherein the symbol synchronizer circuit is further adapted to use a mask-in window for each of the plurality of symbols for selecting a desirable same state transition from the sequence of state transitions effected by a desirable sequence of frequency deviations in the multi-level radio signal.

16. The radio receiver as recited in claim 15, wherein the mask-in window is applied when the sequence of state transitions counted within a predetermined time indicates a presence of a desirable frequency deviation in the multi-level radio signal.

17. The radio receiver as recited in claim 15, wherein the symbol synchronizer circuit is further adapted to delay the desirable same state transition one symbol period less a predetermined offset.

18. The radio receiver as recited in claim 15, wherein frequency deviations have polarities with respect to a frequency reference, and wherein the desirable sequence of frequency deviations comprises a first frequency deviation transitioning to a second frequency deviation having an opposite polarity to the first frequency deviation and having a magnitude of deviation greater than a predetermined value.

19. A selective call receiver comprising the radio receiver of claim 11.

20. A radio receiver, comprising:
a receiver circuit for receiving a multi-level radio signal having a plurality of symbols transmitted by a radio communication system; and
a symbol synchronizer circuit having an internal reference, the symbol synchronizer circuit coupled to the receiver circuit, and adapted to:
cause the receiver circuit to convert the multi-level radio signal to a sequence of state transitions representative of the plurality of symbols;
detect a first plurality of same state transitions from the sequence of state transitions;
use a mask-out window for generating a second plurality of same state transitions, wherein the mask-out window is applied to each of the plurality of symbols for eliminating same state transitions in the first plurality of same state transitions caused by noise in the multi-level radio signal;
use a mask-in window for generating a third plurality of same state transitions, wherein the mask-in window is applied to each of the plurality of symbols for selecting a desirable same state transition from the second plurality of same state transitions effected by a desirable sequence of frequency deviations in the multi-level radio signal; and
synchronize the internal reference to at least one symbol edge of the plurality of symbols based on the third plurality of same state transitions.

21. A selective call receiver comprising the radio receiver of claim 20.

22. A radio receiver, comprising:
a receiver circuit for receiving a multi-level radio signal having a plurality of symbols transmitted by a radio communication system;
a symbol synchronizer circuit having an internal reference, the symbol synchronizer circuit coupled to the receiver circuit, and adapted to:
cause the receiver circuit to convert the multi-level radio signal to a sequence of state transitions representative of the plurality of symbols;
detect a first plurality of same state transitions from the sequence of state transitions;
use a mask-out window for generating a second plurality of same state transitions,
wherein the mask-out window is applied to each of the plurality of symbols for eliminating same state transitions in the first plurality of same state transitions caused by noise in the multi-level radio signal, and
wherein the mask-out window selects a first same state transition occurring during a symbol period, and eliminates subsequent same state transitions occurring during the symbol period;
using a mask-in window for generating a third plurality of same state transitions,
wherein the mask-in window is applied to each of the plurality of symbols for selecting a desirable same state transition from the second plurality of same state transitions effected by a desirable sequence of frequency deviations in the multi-level radio signal, wherein frequency deviations have polarities with respect to a frequency reference, and wherein the desirable sequence of frequency deviations comprises a first frequency deviation transitioning to a second frequency deviation having an opposite polarity to the first frequency deviation and having a magnitude of deviation greater than a predetermined value, and wherein the mask-in window is applied when the sequence of state transitions counted within a predetermined time indicates a presence of a desirable frequency deviation in the multi-level radio signal;

delay the third plurality of same state transitions one symbol period less a predetermined offset; and synchronize the internal reference to at least one symbol edge of the plurality of symbols based on the delayed third plurality of same state transitions.

23. A selective call receiver comprising the radio receiver of claim 22.

24. A selective call receiver, comprising:

a receiver circuit for receiving a multi-level radio signal having a plurality of symbols transmitted by a radio communication system; and a processor having an internal reference, the processor coupled to the receiver circuit, and adapted to:

cause the receiver circuit to demodulate the multi-level radio signal to in-phase and quadrature signals;

convert the in-phase and quadrature signals to a sequence of state transitions representative of the plurality of symbols;

detect at least one same state transition from the sequence of state transitions; and synchronize the internal reference to at least one symbol edge of the plurality of symbols based on the at least one same state transition.

* * * * *